(12) United States Patent
Mackin

(10) Patent No.: US 9,713,305 B2
(45) Date of Patent: Jul. 25, 2017

(54) HARVESTING HEAD SUPPORT ARRANGEMENT

(71) Applicant: Deere & Company, Moline, IL (US)

(72) Inventor: Ryan P. Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 44 days.

(21) Appl. No.: 14/808,366

(22) Filed: Jul. 24, 2015

(65) Prior Publication Data

US 2017/0020070 A1    Jan. 26, 2017

(51) Int. Cl.
*A01D 34/00*    (2006.01)
*A01D 41/14*    (2006.01)

(52) U.S. Cl.
CPC .................................. *A01D 41/145* (2013.01)

(58) Field of Classification Search
CPC ...... A01D 41/145; A01D 41/14; A01D 41/16; A01B 63/10
USPC .................................................. 56/15.8, 14.5
See application file for complete search history.

(56) References Cited

U.S. PATENT DOCUMENTS

| | | | | |
|---|---|---|---|---|
| 3,431,711 A * | 3/1969 | Claas | .................... | A01D 41/12 56/14.5 |
| 3,665,688 A * | 5/1972 | Sheehan | ................ | A01D 41/14 56/14.6 |
| 3,783,594 A * | 1/1974 | Watt | ...................... | A01D 57/00 56/15.8 |
| 4,254,606 A * | 3/1981 | Schumacher, II | ... | A01D 41/145 267/122 |
| 4,313,294 A * | 2/1982 | Martenas | ............. | A01D 41/145 56/15.8 |
| 4,612,757 A * | 9/1986 | Halls | ..................... | A01D 75/287 56/10.2 E |
| 5,327,709 A * | 7/1994 | Webb | ..................... | A01D 67/00 56/14.4 |
| 5,359,837 A * | 11/1994 | Schumacher | ....... | A01B 63/1117 172/2 |
| 7,555,883 B2 * | 7/2009 | Fackler | ................ | A01D 41/145 56/10.2 E |
| 7,669,392 B2 * | 3/2010 | Ehrhart | ................ | A01D 34/283 56/10.2 E |
| 7,869,922 B2 * | 1/2011 | Otto | ..................... | A01D 41/141 56/10.2 E |
| 8,826,635 B2 * | 9/2014 | Schraeder | ............ | A01D 41/145 56/10.2 E |

(Continued)

*Primary Examiner* — Árpád Fábián-Kovács
(74) *Attorney, Agent, or Firm* — Rathe Lindenbaum LLP

(57) ABSTRACT

A support arrangement for an agricultural harvesting head comprises a feederhouse (102) supported on an agricultural harvester (104); a first hydraulic cylinder (108) and a second hydraulic cylinder (110) disposed to raise and lower the feederhouse on the agricultural combine when the cylinders are extended and retracted, respectively; a first coil spring (112) and a second coil spring (114) disposed about the first hydraulic cylinder (108) and the second hydraulic cylinder (110), respectively, to support the feederhouse (102) on the agricultural harvester (104); a member (116) extending between the first coil spring and the second coil spring and abutting a rear end of the first coil spring and the second coil spring; and a third hydraulic cylinder (118) abutting the member (116) and disposed to move the member along the first hydraulic cylinder (108) and the second hydraulic cylinder (110) when the third hydraulic cylinder (118) is extended.

12 Claims, 3 Drawing Sheets

(56) References Cited

U.S. PATENT DOCUMENTS

2011/0120357 A1* 5/2011 Schilling ................ A01C 7/205
111/163

* cited by examiner

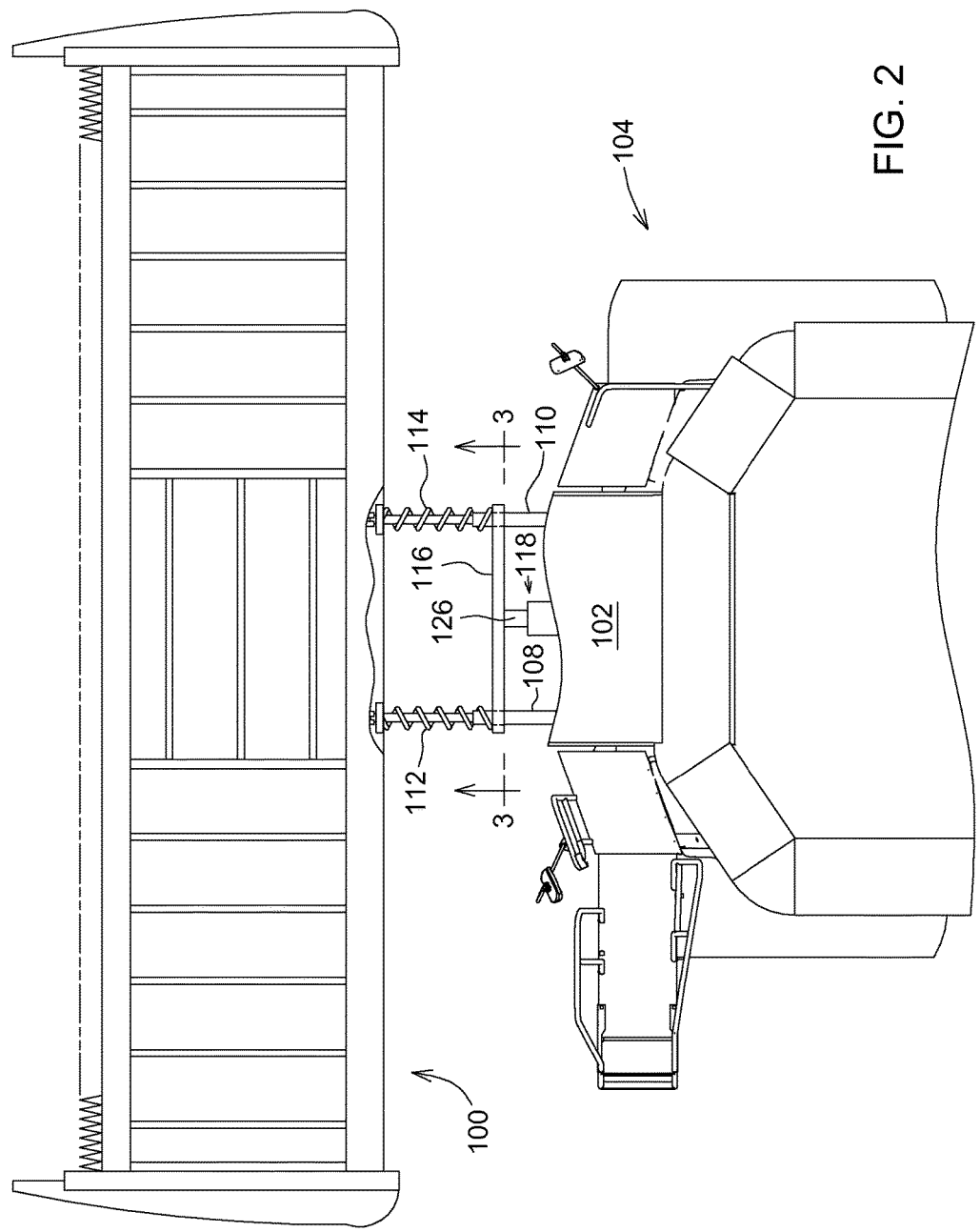

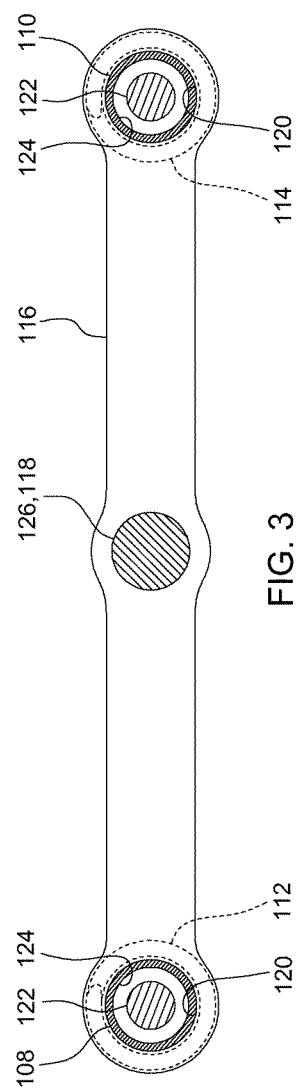

US 9,713,305 B2

HARVESTING HEAD SUPPORT ARRANGEMENT

FIELD OF THE INVENTION

This invention relates to agricultural harvesters. More particularly it relates to agricultural harvesting head support arrangements for harvesting heads of agricultural harvesters.

BACKGROUND OF THE INVENTION

Agricultural harvesting heads are designed to be mounted on the front ends of agricultural harvesters. Typically, the agricultural harvesting head is configured to be supported on a feederhouse that extends forward from the front of the agricultural harvester. The feederhouse has an internal conveyor which conveys cut crop from the harvesting head to the agricultural harvester itself.

Typically, the agricultural harvesting head is pivotally connected to the agricultural harvester and is supported by hydraulic cylinders that are disposed beneath the feederhouse. As the hydraulic cylinders extend, they push against the lower portion of the feederhouse, causing the front end of the feederhouse to pivot upward with respect to the agricultural harvester, and vice versa.

In this manner, the height of the front of the feederhouse, and therefore the height of the agricultural harvesting head itself with respect to the ground can be increased or decreased. During operation of the agricultural harvester, it is often necessary to change the height of the agricultural harvesting head to harvest crops more efficiently.

Agricultural harvesting heads have increased in width and therefore in weight over time. To support this additional weight, hydraulic lift cylinders with larger pistons and therefore larger cylinders are required. This increases the weight of the agricultural harvester. It also increases the volume of high-pressure hydraulic fluid that must be generated and pumped into and out of the hydraulic cylinders as the agricultural harvesting head is alternately raised and lowered during harvesting.

What is needed, therefore, is an improved support arrangement for supporting the weight of agricultural harvesting head on the front of an agricultural harvester.

It is an object of this invention to provide such an improved support arrangement.

SUMMARY OF THE INVENTION

In accordance with a first aspect of the invention, a support arrangement for an agricultural harvesting head, comprises a feederhouse supported on an agricultural harvester; a first hydraulic cylinder and a second hydraulic cylinder disposed to raise and lower the feederhouse on the agricultural combine when the cylinders are extended and retracted, respectively; a first coil spring and a second coil spring disposed about the first hydraulic cylinder and the second hydraulic cylinder, respectively, to support the feederhouse on the agricultural harvester; a member extending between the first coil spring and the second coil spring and abutting a rear end of the first coil spring and the second coil spring; and a third hydraulic cylinder abutting the member and disposed to move the member along the first hydraulic cylinder and the second hydraulic cylinder when the third hydraulic cylinder is extended.

The member may have a first aperture at a first end of the member through which the first hydraulic cylinder extends, and has a second aperture at a second end of the member through which the second hydraulic cylinder extends.

The first aperture may be a hole and the second aperture may be a hole.

The third hydraulic cylinder may abut the member at a midpoint of the member.

The third hydraulic cylinder may abut the member at a point midway between the first aperture and the second aperture.

The first hydraulic cylinder and the second hydraulic cylinder may be disposed parallel to each other, may extend in a fore-and-aft direction, and may be vertically located below the feederhouse.

The third hydraulic cylinder may be disposed between the first hydraulic cylinder and the second hydraulic cylinder and may be oriented horizontally.

A longitudinal axis of the rod of the third hydraulic cylinder may extend parallel to a longitudinal axis of a rod of the first hydraulic cylinder and the second hydraulic cylinder.

The third hydraulic cylinder may be disposed to compress the first coil spring and the second coil spring when the third hydraulic cylinder extends.

In accordance with a second aspect of the invention, an agricultural harvester may comprise the support arrangement of claim 1.

BRIEF DESCRIPTION OF THE DRAWINGS

FIG. 2 is a plan view of the harvester and harvesting head of FIG. 1.

FIG. 3 is a cross-sectional view through the support arrangement of FIGS. 1 and 2 which is taken at section line 3-3 in FIG. 2.

DETAILED DESCRIPTION

Figure 1:
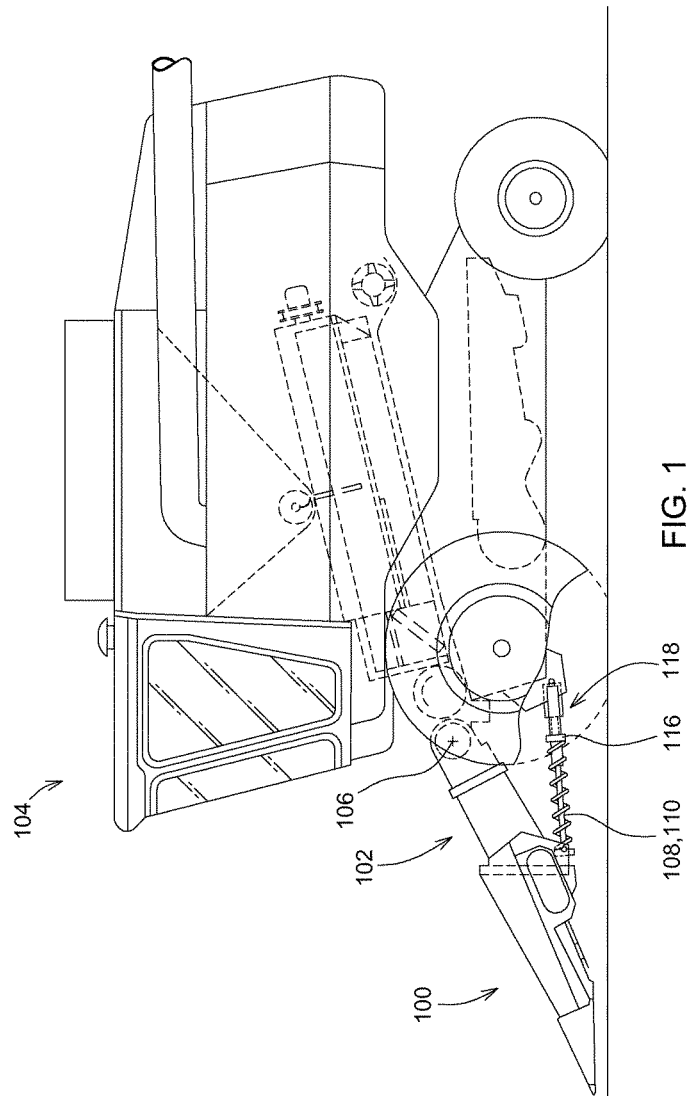
FIG. 1 is a side view of an agricultural harvester and agricultural harvesting head in accordance with the present invention.

Referring to FIGS. 1-3, an agricultural harvesting head 100 (here shown as a corn head) is supported on a feederhouse 102, which extends forward from an agricultural harvester 104. The feederhouse 102 is pivotally coupled to the rest of the agricultural harvester 104 to pivot about a laterally extending and generally horizontal axis 106.

Two hydraulic cylinders 108, 110 are coupled between the agricultural harvester 104 and a lower portion of the feederhouse 102 to raise and lower the front of the feederhouse when the two hydraulic cylinders 108, 110 are extended and retracted, respectively. When the front of the feederhouse 102 is raised or lowered, it raises or lowers, respectively, the agricultural harvesting head 100. The two hydraulic cylinders 108, 110 are disposed parallel to each other, and extend in a fore-and-aft direction. They are vertically located below the feederhouse 102.

A coil spring 112 extends around the hydraulic cylinder 108, and a coil spring 114 extends around the hydraulic cylinder 110. The forward ends of the coil spring 112 and the coil spring 114 apply a first force to the feederhouse. The rear ends of the coil spring 112 and the coil spring 114 abut a member 116 that extends laterally between the hydraulic cylinder 108 and the hydraulic cylinder 110. The rear ends of the coil spring 112 and the coil spring 114 apply a second force (opposite the first force) to member 116. These forces are applied to the member 116 at the opposing outer ends of member 116.

A third hydraulic cylinder 118 is coupled to the member 116 at a forward end of the third hydraulic cylinder 118. The third hydraulic cylinder 118 is coupled to the agricultural harvester 104 at a rear end of the hydraulic cylinder 118. In this manner, the third hydraulic cylinder 118 can move the member 116, the rear end of the coil spring 112 and the rear end of the coil spring 114 forward and backward with respect to the agricultural harvester 104 when the third hydraulic cylinder 118 extends and retracts. This extension and retraction movement causes the coil spring 112 and the coil spring 114 to become more and less compressed, respectively. The third hydraulic cylinder 118 is disposed between the first hydraulic cylinder 108 and the second hydraulic cylinder 110 and is oriented horizontally. The rod of the third hydraulic cylinder 118 abuts the member 116 at a midpoint of the member 116, a point midway between the two holes 120. The longitudinal axes of the rod of the first hydraulic cylinder, the second hydraulic cylinder, and the third hydraulic cylinder are parallel.

As the third hydraulic cylinder extends, it moves the member 116, which responsively compresses the coil spring 112 and the coil spring 114. As the coil spring 112 and the coil spring 114 become more compressed, they exert a greater force upon the feederhouse 102, which transfers some of the weight of the agricultural harvesting head 100 from the two hydraulic cylinders 108, 110 to the coil springs 112, 114. With this additional means for supporting the weight of the agricultural harvesting head 100, the hydraulic cylinders 108, 110 can be made smaller, can be extended with less hydraulic fluid, and the hydraulic fluid applied to the hydraulic cylinders 108, 110 can be at a lower pressure. Further, the other components used to direct fluid to the hydraulic cylinders 108, 110 can be reduced in size and capacity as well.

Each end of the member 116 has an aperture (here shown as a hole 120) that extends around the rod 122 and cylinder 124 of one of the hydraulic cylinders 108, 110 and through which the hydraulic cylinders 108, 110 extend. The member 116 is supported on hydraulic cylinder 108 and hydraulic cylinder 110 on each end. The rod 126 of the third hydraulic cylinder 118 abuts the member 116 at a midpoint of the member 116.

The detailed description and drawings are provided to illustrate at least one way of making the invention. The invention itself is defined by the claims below. Other ways of making the invention are possible. Based upon the description and drawings in this document, those other ways would be clear to someone experienced in designing agricultural harvesters and agricultural harvesting heads.

The invention claimed is:

1. A support arrangement for an agricultural harvesting head, comprising:
    a feederhouse supported on an agricultural harvester;
    a first hydraulic cylinder and a second hydraulic cylinder disposed to raise and lower the feederhouse on the agricultural combine when the cylinders are extended and retracted, respectively;
    a first coil spring and a second coil spring disposed about the first hydraulic cylinder and the second hydraulic cylinder, respectively, to support the feederhouse on the agricultural harvester;
    a member extending between the first coil spring and the second coil spring and abutting a rear end of the first coil spring and the second coil spring; and
    a third hydraulic cylinder abutting the member and disposed to move the member along the first hydraulic cylinder and the second hydraulic cylinder when the third hydraulic cylinder is extended.

2. The support arrangement of claim 1, wherein the member has a first aperture at a first end of the member through which the first hydraulic cylinder extends, and has a second aperture at a second end of the member through which the second hydraulic cylinder extends.

3. The support arrangement of claim 2, wherein the first aperture is a hole and the second aperture is a hole.

4. The support arrangement of claim 1, wherein the third hydraulic cylinder abuts the member at a midpoint of the member.

5. The support arrangement of claim 2, wherein the third hydraulic cylinder abuts the member at a point midway between the first aperture and the second aperture.

6. The support arrangement of claim 1, wherein the first hydraulic cylinder and the second hydraulic cylinder are disposed parallel to each other, wherein they extend in a fore-and-aft direction, and wherein they are vertically located below the feederhouse.

7. The support arrangement of claim 6, wherein the third hydraulic cylinder is disposed between the first hydraulic cylinder and the second hydraulic cylinder and is oriented horizontally.

8. The support arrangement of claim 7, wherein a longitudinal axis of the rod of the third hydraulic cylinder extends parallel to a longitudinal axis of a rod of the first hydraulic cylinder and the second hydraulic cylinder.

9. The support arrangement of claim 1, wherein the third hydraulic cylinder is disposed to compress the first coil spring and the second coil spring when the third hydraulic cylinder extends.

10. An agricultural harvester comprising the support arrangement of claim 1.

11. The support arrangement of claim 1, wherein the first hydraulic cylinder and the second hydraulic cylinder extend on a first side of the member and wherein the third hydraulic cylinder extends on a second side of the member, opposite the first side.

12. The support arrangement of claim 1, wherein the first hydraulic cylinder and the second hydraulic cylinder pass through the member and wherein member is slidable along the first hydraulic cylinder and the second hydraulic cylinder.

* * * * *